United States Patent [19]

Hays

[11] Patent Number: 5,337,870
[45] Date of Patent: Aug. 16, 1994

[54] CLUTCH DESIGN AND MANUFACTURE

[76] Inventor: Bill J. Hays, 15114 Adams St., Midway City, Calif. 92655

[21] Appl. No.: 35,281

[22] Filed: Mar. 22, 1993

[51] Int. Cl.$^5$ .............................................. F16D 13/64
[52] U.S. Cl. ................. 192/70.14; 192/107 R; 192/107 C; 192/107 M
[58] Field of Search ............ 192/70.14, 107 R, 107 C, 192/107 M

[56] References Cited

U.S. PATENT DOCUMENTS

| | | | |
|---|---|---|---|
| 1,754,233 | 4/1930 | Fisher | 192/107 R |
| 1,883,981 | 10/1932 | Lane | 192/107 R |
| 2,253,316 | 8/1941 | Armitage | 192/107 R |
| 2,260,869 | 10/1941 | Ruesenberg | 192/70.14 |
| 2,270,477 | 1/1942 | Ruesenberg | 192/107 C |
| 2,541,979 | 2/1951 | Amundsen | 192/107 R |
| 4,287,978 | 9/1981 | Staub, Jr. | 192/107 R X |
| 4,591,041 | 5/1986 | Valier | 192/107 R |
| 4,646,900 | 3/1987 | Crawford et al. | 192/107 R |
| 4,747,476 | 5/1988 | East et al. | 192/107 R X |
| 5,196,081 | 5/1993 | Bicknel | 192/107 C X |

FOREIGN PATENT DOCUMENTS

| | | | |
|---|---|---|---|
| 54-159548 | 12/1979 | Japan | 192/107 M |
| 322876 | 12/1929 | United Kingdom | 192/107 R |
| 2191831 | 12/1987 | United Kingdom | 192/107 C |

*Primary Examiner*—Leslie A. Braun
*Assistant Examiner*—Andrea Pitts
*Attorney, Agent, or Firm*—Plante Strauss & Vanderburgh

[57] ABSTRACT

There is disclosed a frictional member, or ring, which is substituted for the conventional friction linings and marcel of an automotive clutch. The frictional ring is preferably a monolithic member which has recesses that receive support brackets which attach the frictional ring to the clutch disc. Preferably, the frictional ring includes spring biased islands which permit a phased or progressive engagement of the disc between the pressure plate and flywheel.

17 Claims, 5 Drawing Sheets

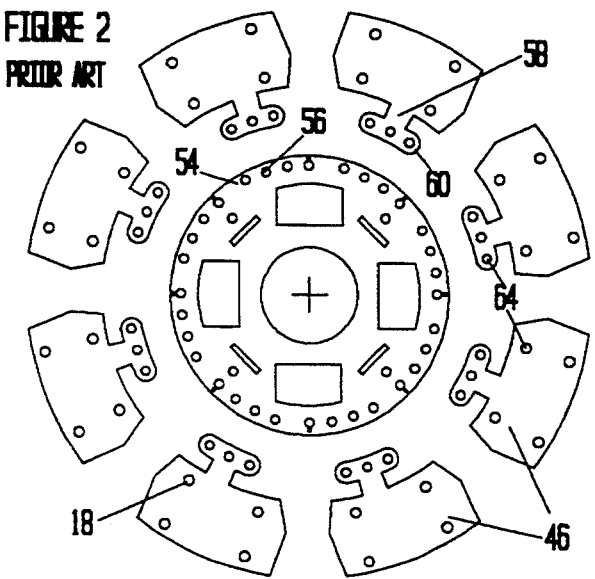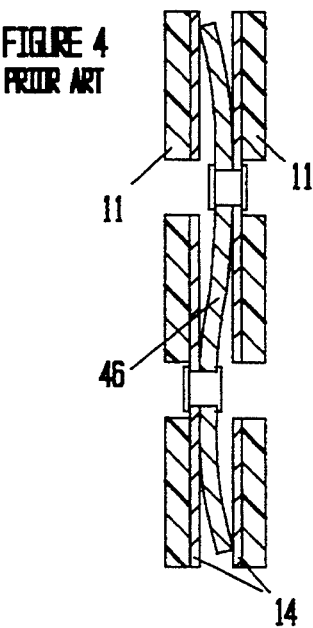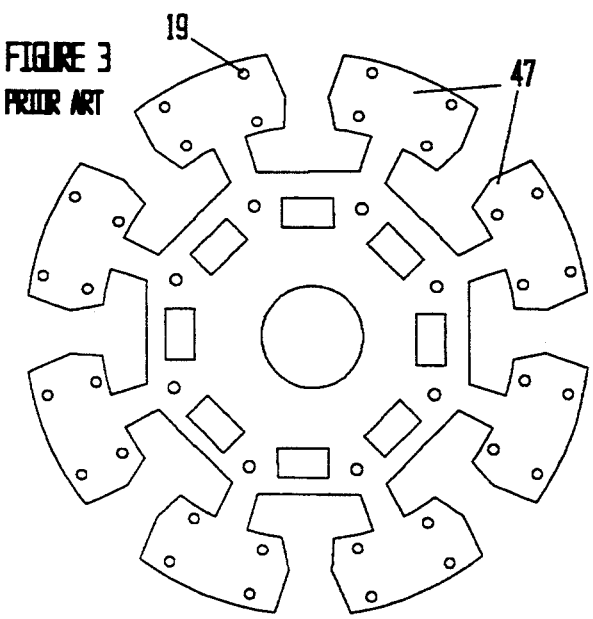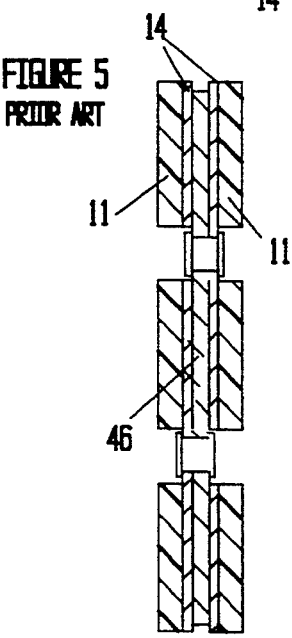

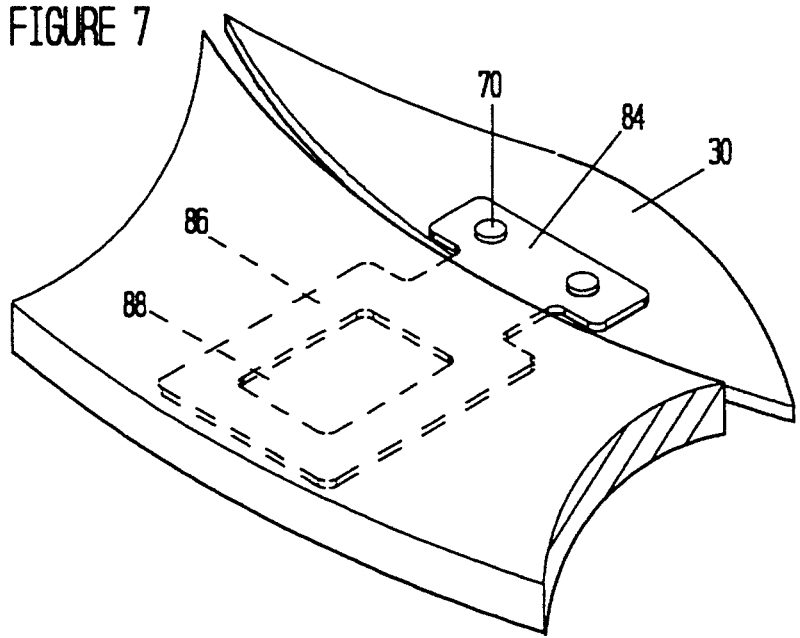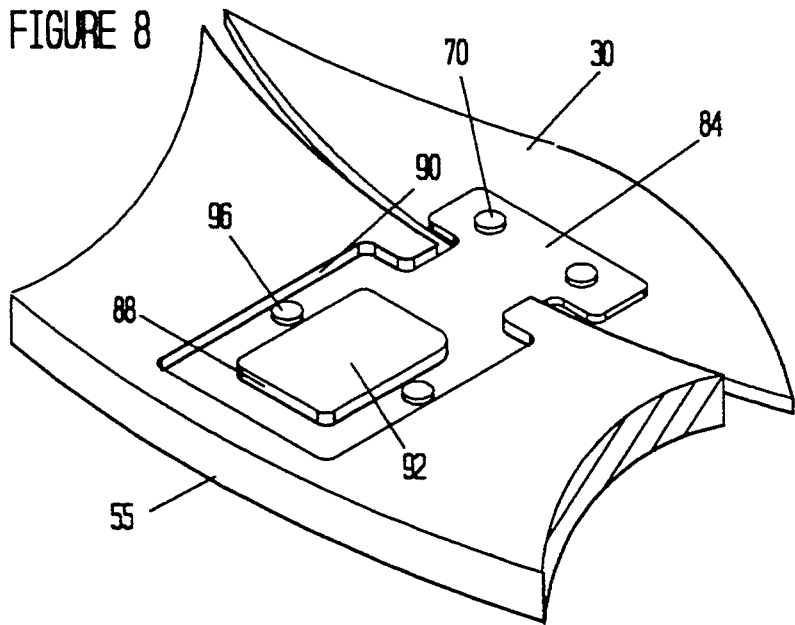

CLUTCH DESIGN AND MANUFACTURE

BACKGROUND OF THE INVENTION

1. Field of Invention

This invention relates to clutches for motor vehicles and, in particular, to an improved design and use of a frictional ring rather than conventional frictional linings in automotive clutches.

2. Brief Statement of the Prior Art

The typical automotive clutch has a clutch disc fixedly secured to the drive shaft and supported between the flywheel and a pressure plate. The clutch cover, which is bolted onto the flywheel includes a conical (Belleville) spring that is actuated by a clutch throw out mechanism and hydraulics to release the Belleville spring force against the pressure plate, clamping the clutch disc between the pressure plate and flywheel. The clutch disc has a marcel, which is a segmented wave washer usually formed of separate segments riveted to the clutch disc which support frictional linings on its opposite sides. The clutch linings typically have a high frictional coefficient material, usually an organic composite laminated to a metal annular ring and are riveted to the marcel. The marcel provides smooth clutch engagement by imparting a progressive, rather than abrupt, disc engagement.

The most commonly used frictional linings are organic composite linings which are molded or bonded to a metal support ring, and drilled with a preselected pattern of holes to receive rivets which secure the assembly of the linings to the opposite sides of the marcel. Metal support rings are preferred with conventional engineering wisdom, on the theory that the metal ring enhances heat transfer from the linings, and because the metal ring provides the necessary strength to take the hoop stresses placed on the linings at high speeds of revolution. Because the torque loads which are imposed on the linings are very substantial and because all the torque load is received in shear loads on the rivets, many rivets are required to secure the typical assembly of linings to the marcel and clutch disc. The large number of rivets reduces the frictional surface area of the linings. Manufacturing and servicing of clutches is also costly, and a significant factor is the machining, parts and assembly time required to place and fasten the many rivets used to secure the facings to the marcel.

There have been many improvements in materials and designs for clutch discs, including the replacement of asbestos-containing facings with organic composite linings or metallic linings, to avoid potential health hazards to the public. All the designs, however, have continued to use a conventional lining, which as mentioned above, is formed with a support ring, usually of metal, to which is bonded a material of high frictional characteristics.

There exists, today, a need for a simple and efficient frictional member for use in an otherwise conventional automotive clutch. Ideally, the frictional member will be an integral or monolithic member with its opposite faces engaging the pressure ring and flywheel, thereby avoiding the costly machining and assembly of frictional linings to a marcel or clutch disc.

OBJECTIVES OF THE INVENTION

It is an object of this invention to provide a clutch of superior performance.

It is a further object of this invention to provide a frictional member to replace the conventional friction linings used for automotive clutches.

It is a still further object of this invention to provide a frictional member which is integral with opposite frictional surfaces for engagement against the pressure ring and flywheel.

It is also an object of this invention to provide a frictional member which is useful for retrofit or original manufacturer equipment, without substantial retooling, and without requiring re-machining of the mechanical components of the clutch.

Other and related objects will be apparent from the following description of the invention.

BRIEF STATEMENT OF THE INVENTION

This invention comprises a frictional member, or ring, which is substituted for the conventional friction linings and marcel of an automotive clutch. The frictional ring is preferably a monolithic member which has recesses that receive support brackets which attach the frictional ring to the clutch disc. Preferably, the frictional ring includes spring biased islands which permit a phased or progressive engagement of the disc between the pressure plate and flywheel.

BRIEF DESCRIPTION OF THE DRAWINGS

The invention will be described with reference to the figures of which:

FIGS. 2 and 3 are plan views of conventional marcels of the prior art and are taken from *Clutch & Flywheel Handbook* p. 11 (1977);

FIGS. 4 and 5 are sectional views a marcel and linings conventional used in prior art clutches in the uncompressed and compressed state, and are take from *Clutch & Flywheel Handbook*, p. 12 (1977);

FIGS. 7 and 8 are illustrations of alternative attachments of the frictional ring of this invention to a clutch disc;

FIGS. 8–12 are illustrations of alternative spring biased buttons in the frictional ring of the invention which provide a phased engagement of the clutch disc.

DESCRIPTION OF PREFERRED EMBODIMENT

Figure 1:
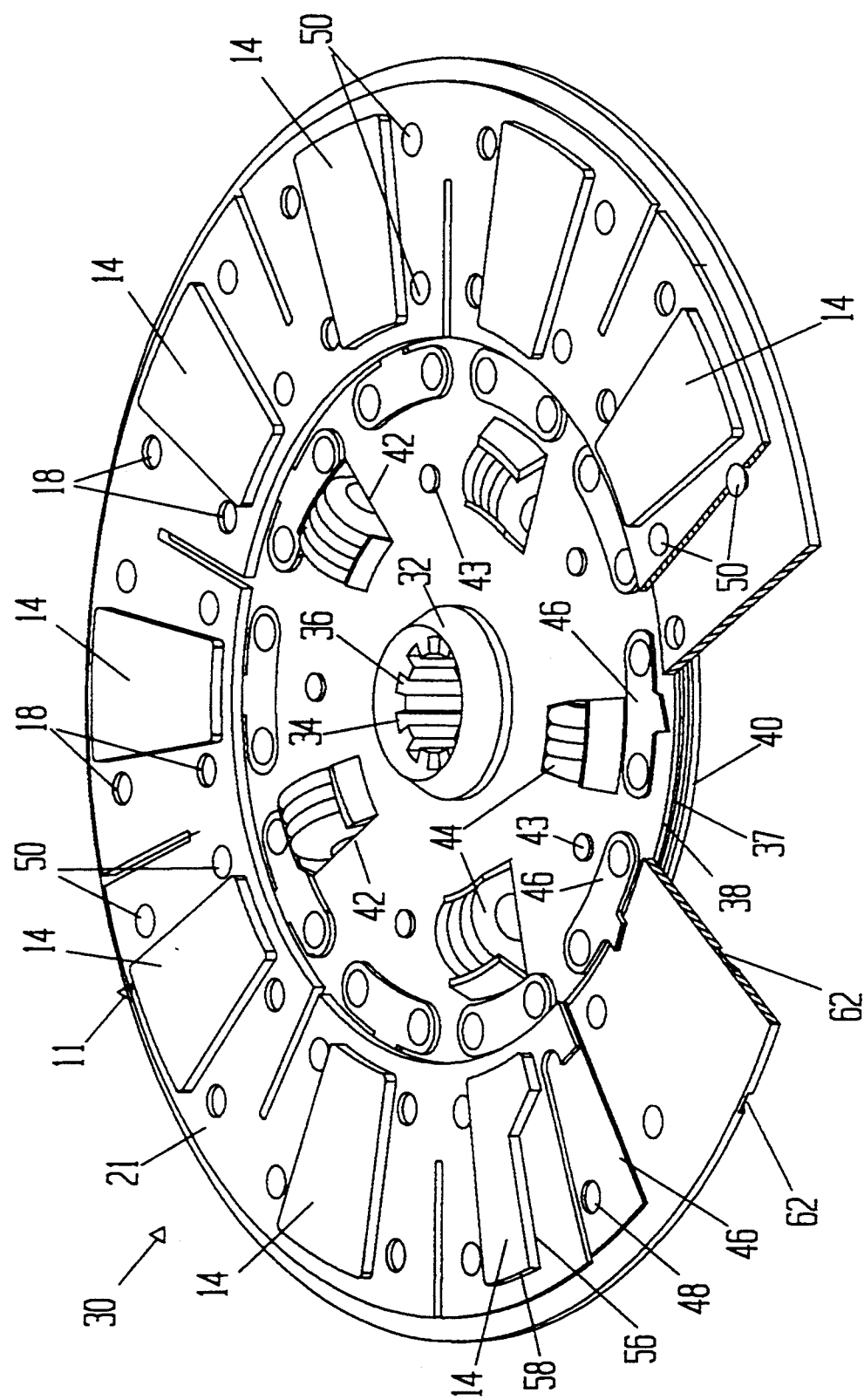
FIG. 1 is a perspective, partially sectioned view of a conventional clutch disc illustrating the prior art linings.

FIGS. 1 through 5 illustrates the prior art design for an automotive clutch disc. The clutch disc 30 is illustrated with a portion cut away to illustrate the locations and relative sizes of the various components. The clutch disc 30 has a central hub 32 with a through aperture 34 bearing internal splines 36 for sliding engagement and rotational indexing to a drive shaft. The hub is supported on a central plate 37 which is sandwiched between an upper plate 38 and a lower plate 40, which are secured in the assembly with fasteners 42 and which are held in a spaced apart relationship, on opposite sides of the central plate 37 by spacers (not shown).

A plurality of compression springs 44 are received in through slots 42 in the upper plate 38 and the lower plate 40. The central plate 37 also has aligned slots to receive the springs, which thus provide a resilient rotational interlock between these central hub plate (and hub 32) and the upper and lower plates 38 and 40, thus providing a dampening response to forces applied between the disc 30 and the drive shaft.

The upper plate 38 has a plurality of marcels 46, which are riveted to the plate 38 about its periphery in even incremental spacings. These marcels extend outwardly and provide support for the frictional linings of the disc. For this purpose, the marcels have a pattern of through holes 48 to receive rivets which attach the frictional linings to its opposite sides. Typical shapes for marcels are shown in FIGS. 2 and 3. The clutch disc shown in FIG. 2 has a peripheral row 54 of apertures 56, and the marcels 46 have a support arm 58 which extends to a base tab 60 that has apertures 64 which align with the apertures 56 in the disc, permitting each marcel 46 to be riveted to the clutch disc 30 with three rivets. The clutch disc shown in FIG. 3 has marcels 47 which are integral with the disc, and are supported by arms 59. In both cases, the marcels have a preselected pattern of holes 18 and 19 to receive fasteners such as rivets for assembly of the frictional linings to the marcels 46, in the manner shown in FIG. 1. The holes 18 and 19 are located at a predetermined or preset geometric spacings for the particular clutch disc.

The marcels 46 provide a phased engagement of the clutch disc, when the pressure plate is clamped against the disc. FIG. 4 is a sectional view through the frictional lining 11, and the marcels 46, illustrating that the marcel 46 in its normal or uncompressed configuration has a wave or sinusoidal shape. As the clutch disc is compressed between the pressure plate and flywheel, the marcel 46 is straightened into the configuration shown in FIG. 5, where it is in full contact with the backing plate 14 of the frictional lining 11.

Figure 6:
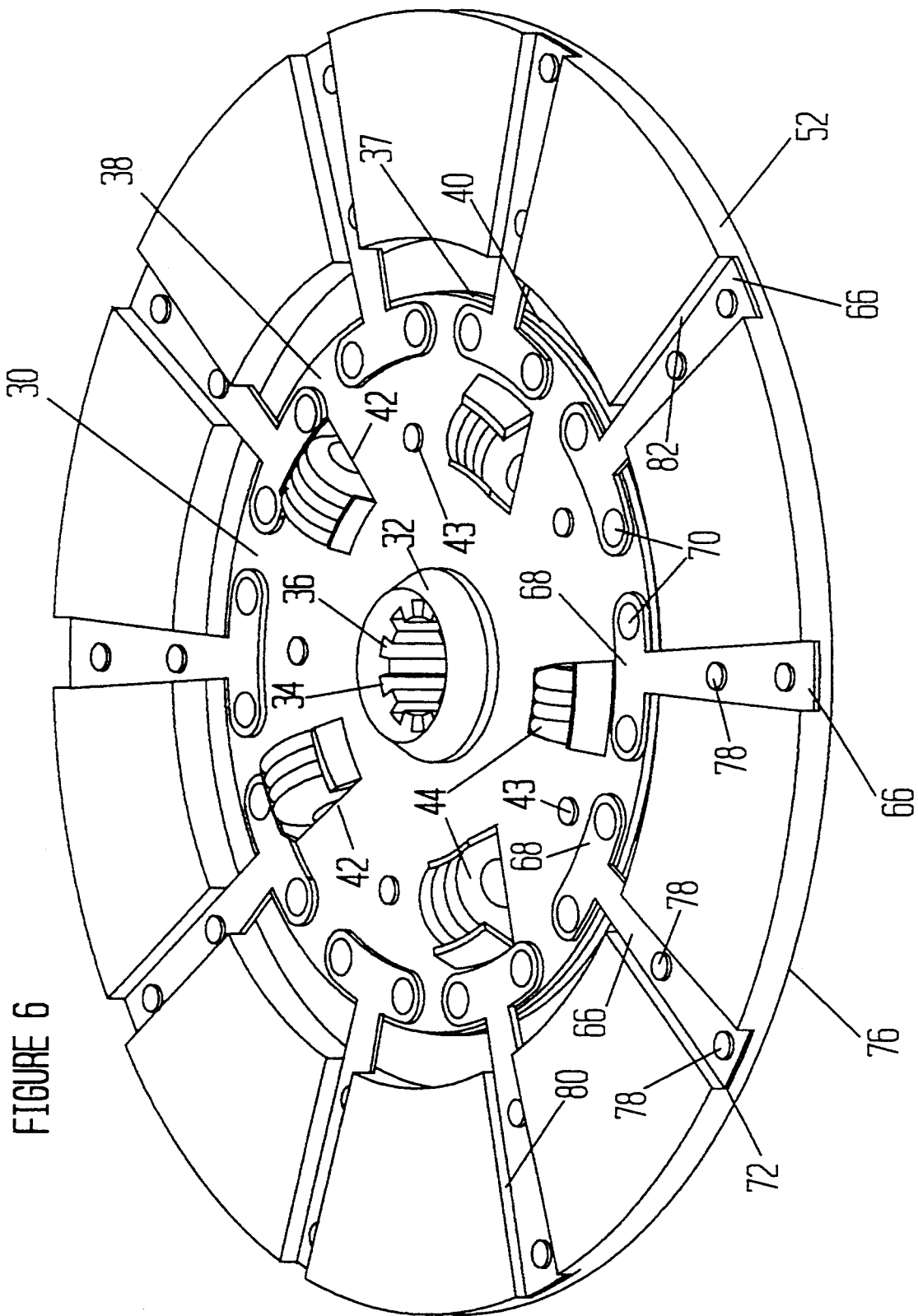
FIG. 6 is a perspective view of a clutch disc with the frictional ring of this invention.

Referring now to FIG. 6, the frictional ring 52 of the invention is illustrated, installed on an otherwise conventional clutch disc 30. The clutch disc 30 is the same as that illustrated in FIG. 1, and has a central hub 32 with a splined, through aperture 34 for sliding engagement and rotational indexing to a drive shaft.

A plurality of compression springs 44 are received in through slots 42 in the upper plate 38 and the lower plate 40. The central plate 37 also has aligned slots to receive the springs, which thus provide a resilient rotational interlock between the central hub plate (and hub 32) and the upper and lower plates 38 and 40, thus providing a dampening response to forces applied between the disc 30 and the drive shaft.

The clutch disc 30 has a peripheral row of apertures, similar to holes 56, shown in FIG. 2. A plurality of wing brackets 66 with base tabs 68 are secured with fasteners, e.g., rivets 70, which extend through apertures in the base tabs which are aligned with the peripheral apertures in the disc. The frictional ring 52 of the invention is a dualsided frictional surfaced member. It is formed of a single piece, monolithic body which can be made of carbon, graphite, or thermosetting organic resins such as polyamides, urea formaldehyde, polyimides, polysulfides, etc. Preferably the ring material is reinforced with fibrous materials such as chopped fiberglass, graphite fibers and the like. A material which can also be used is available under the designation: CARBON-CARBON, from HITCO, Gardena, Calif. This facing has a very high density carbon, with excellent wear and frictional properties. It has a porous carbon structure. It has the desirable characteristic of light weight, thereby reducing the inertia of the clutch disc and wear on the transmission. Another suitable composite organic facing is available under the designation: VGL LOCK from the Ray Mark Corporation, Manheim, Pa.

The friction ring 52 has a plurality of recesses 72 in one or both of its frictional faces 74 and 76, and these recesses 72 receive the wing brackets 66. The assembly is preferably secured by one or more rivets 78 which extend through aligned apertures in the wing brackets and in the bottom wall of each recess 72.

In contrast to the conventional riveted linings, such as shown in FIG. 1, the frictional ring 52 of the invention is an integral member which is clamped between the pressure plate and the flywheel. There is no need to provide rivets to transmit the torque load applied to the frictional faces of the ring 74 and 76, as the ring 52 is integral and such forces are absorbed in shear loading of the material of the frictional ring 52. The rivets 78 retain the assembly against axial displacement and are not necessary to absorb torque loads between the ring and the disc 30, as the interlock between the wing brackets 66 and the recesses 72 provided transmits the torque loads. For this purpose, the wing brackets 66 fit snugly within the recesses 72, with the radial walls 80 and 82 of the recesses 72 providing the rotational interlock with the wing brackets.

Alternative attachments between the clutch disc 30 and the wing brackets are shown in FIGS. 7 and 8. In FIG. 7, the wing brackets 84 are embedded within the body of the frictional ring 53, formed therein during the molding of the ring 53. Preferably, the wing brackets 84 can have an expanded surface within the ring 53, such as the rectangular area 86 which can be provided with one or more through apertures 88 to enhance bonding within the body of the ring 53.

FIG. 8 shows a similarly shaped wing bracket 84 which is received within a mating recess 90 in a frictional face 75 of the frictional ring 55. The recess 90 closely matches the size and shape of the wing bracket 84 to insure secure rotational interlock between the disc 30 and the frictional ring 55. This interlock can be enhanced by an island 92 in the recess 90 which is received in the aperture 88 of the wing bracket 84, thereby effectively increasing the total area of wall 94 which transmits the torque load between the disc 30 and the ring 55. As with the embodiment shown in FIG. 6, one or more rivets 96 can be used to secure the ring 55 to the wing bracket 84, preventing any axial displacement.

Figure 9:
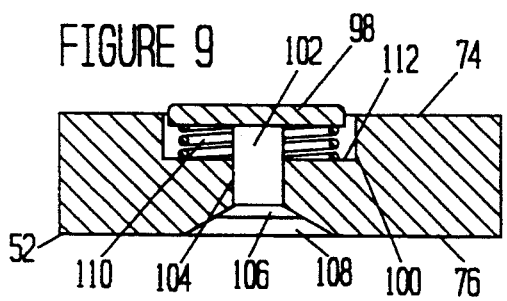

The frictional ring of the invention can be provided with mechanisms which will phase in engagement of the ring between the pressure plate and flywheel, similarly to the phased engagement exhibited with marcel equipped clutch discs. FIGS. 9-13 illustrate various embodiments of such mechanisms. As shown in FIG. 9, one or more buttons 98 can be placed about the surface of the frictional ring 52, in recesses 100 on either or both frictional surface 74 and 76. The buttons 98 have a central post 102 which extends through an aperture 104 in the ring 52 and which has a tapered head 106 which is received in a countersunk recess 108 on the opposite surface 76 of the ring 52. A compression spring, such as coil spring 110, is captured between the bottom of the button 98 and the bottom wall 112 of the recess 100 to bias the button 98 outwardly, as shown. The provision of a plurality of such buttons 98, evenly spaced about either or both of the frictional facings 74 and 76, will provide a phased engagement of the ring 52 with the pressure plate and flywheel.

Figure 10:
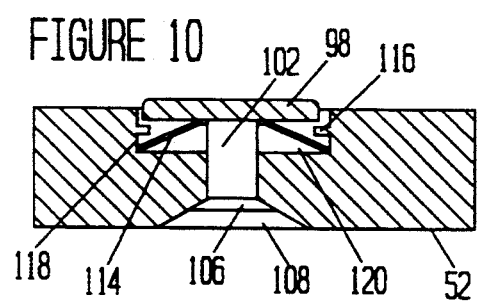

FIG. 10 illustrates substantially the same mechanism as FIG. 9, however, the coil spring 110 is replaced with a Belleville spring washer 114. Also, an annular rim 116 is provided about the inner wall 118 of the recess 120 to retain the spring washer 114.

Figure 11:
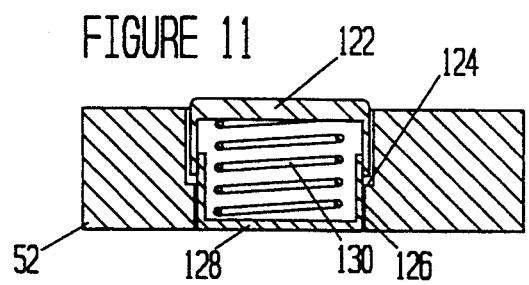

FIG. 11 illustrates another mechanism in which a cup shaped button 122 is received in an enlarged counterbore 124 of a through aperture 126 in the ring 52. The entire mechanism is self-contained, with a base cup 128 that is telescopingly received in the cup-shaped button 122. A compression coil spring 130 is captured within the assembly, which is retained in the ring 52 by a frictional fit between the base cup 128 and the receiving aperture 126 in the ring 52.

Figure 12:
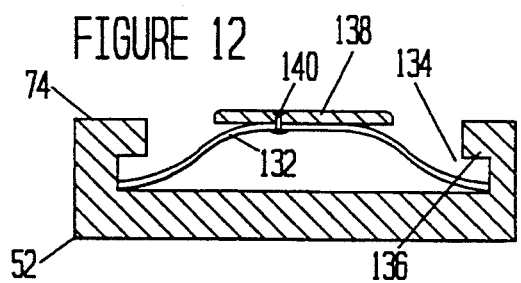
Figure 13:
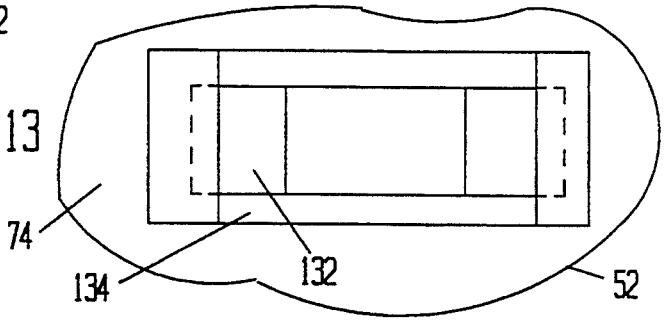

FIGS. 12 and 13 illustrate another mechanism which uses a leaf spring 132 which is seated in a recess 134 in the frictional facing 74 of the ring 52. Preferably the recess 134 is undercut to provide shoulders 136 which capture the leaf spring 132. A button 138 formed of an abrasion resistant frictional material is secured to the leaf spring with a suitable fastener such as a countersunk rivet 140.

The frictional ring of the invention provides a number of advantages over the conventional use of frictional linings in automotive clutches. It is a single piece and has significantly reduced manufacturing costs such as reduced grinding costs, fewer total parts, less molding, tooling, drilling and counterboring, faster assembly, and less shop waste than the frictional linings conventionally used for automotive clutches.

The frictional ring of the invention provides improved performance as it increases thermal conductivity between the pressure plate and flywheel, it has a greater "burst" strength to resist disintegration under the centrifugal forces imposed at high speeds; it has less weight and therefore improves shifting because of reduced inertia. It provides the engineer with great flexibility in design of various geometric shapes which can be molded into the frictional ring, and the ring can be readily formed to adapt to all existing clutch discs. Since the ring has fewer apertures for rivets, it has a greater frictional surface per unit area than conventional linings. There is a tendency of clutches with conventional marcels to trap air and form an air cushion which reduces the clutch release force when operated at high revolutions, and the frictional ring of this invention eliminates this tendency.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In an automotive clutch wherein a clutch disc having an outer periphery and opposite faces is carried on a drive shaft and supports an annular frictional surfaced member between a pressure ring and a flywheel, and including means to apply a compressive clamp load to clamp said disc between said ring and flywheel; the improvement thereof which comprises a friction ring shaped as a singlepiece annular ring having frictional surfaces surrounding said clutch disc and formed entirely of frictional material consisting of organic composite, non-metallic frictional material or metallic frictional material and supported thereon by support means secured about the periphery of said clutch disc, with said ring being of greater thickness than said disc and extending axially beyond the opposite faces of said disc to provide said frictional surfaces for engagement between said pressure plate and flywheel, and including resilient engagement means carried on the surface of said annular ring comprising at least one button of abrasion resistant frictional material received in a recess in a frictional surface of said ring and including resilient means biasing said button above said frictional surface of said annular ring.

2. The clutch improvement of claim 1 wherein said support means comprises a plurality of metal brackets carried on said clutch disc and extending beyond the periphery thereof into attachment to said frictional ring at attachment sites on said frictional ring.

3. The clutch improvement of claim 1 wherein said attachment sites comprise bracket-receiving recesses in at least one of the frictional surfaces of said frictional ring.

4. The clutch improvement of claim 1 wherein said bracket portions are integrally captured within said frictional ring.

5. The clutch improvement of claim 1 wherein said material is an organic composite, non-metallic frictional material.

6. The clutch improvement of claim 1 wherein said bracket-receiving recesses are radial grooves in at least one of said frictional surface of said frictional ring.

7. The clutch improvement of claim 6 including apertures extending through said ring and located in said recesses at positions which align with like apertures in said bracket portions.

8. The automotive clutch of claim 1 wherein said resilient means is a compression spring.

9. The automotive clutch of claim 1 wherein said resilient means is a Belleville spring washer.

10. The automotive clutch of claim 1 wherein said resilient means is a leaf spring.

11. The automotive clutch of claim 1 wherein each of said recesses includes a through aperture, and each of said buttons is distally supported on a post which extends through a respective through aperture and which has an enlarged head to capture said button and post in its respective recess.

12. The automotive clutch of claim 1 wherein each of said buttons comprises an assembly of a cup-shaped button which telescopingly receives a base cup, a compression coil spring received within said assembly, and said assembly being received in said recess.

13. A frictional ring for a clutch disc with opposite faces and a periphery and having a plurality of brackets arranged about the periphery of said disc and having bracket portions which extend beyond said periphery, each bracket portion having a through aperture which comprises:

a) an annular ring formed entirely of a fiber-reinforced resin and having an annular area of substantially greater thickness than said disc;

b) a plurality of recesses in at least one face of said frictional ring, said recesses having shapes corresponding to the bracket portions which extend beyond the periphery of said disc, and including; within each recess, an unrecessed island to be received within the through aperture of each of said bracket portions when said bracket portions are seated in their respective recesses.

14. The frictional ring of claim 13 including apertures extending through said ring and located in said recesses at positions which align with like apertures in said bracket portions.

15. The frictional ring of claim 13 including apertures extending through said ring and located in said recesses at positions which align with like apertures in said bracket portions.

16. The automotive clutch of claim 13 wherein said material is an organic composite, non-metallic frictional material.

17. The combination of the frictional ring of claim 13 and a clutch disc having a plurality of brackets arranged about the periphery of said disc with bracket portions which extend beyond said periphery, each bracket portion having a through aperture, and with said unrecessed islands received within the through apertures of said bracket portions.

* * * * *